United States Patent [19]

Riley

[11] Patent Number: 5,146,785
[45] Date of Patent: Sep. 15, 1992

[54] FLUID LEVEL SENSOR WITH STAIR STEP OUTPUT

[75] Inventor: Richard E. Riley, Riverside, Calif.

[73] Assignee: Spectrol Electronics Corp., Ontario, Calif.

[21] Appl. No.: 647,751

[22] Filed: Jan. 30, 1991

[51] Int. Cl.⁵ ............................................. G01F 23/70
[52] U.S. Cl. .................................. 73/313; 73/304 R; 338/33; 338/176
[58] Field of Search ............ 73/304 R, 313, 319, 73/322.5; 200/84 R; 338/33, 176, 177, 216; 340/628

[56] References Cited

U.S. PATENT DOCUMENTS

| | | | |
|---|---|---|---|
| 2,289,202 | 7/1942 | McKoy | 73/304 R |
| 2,484,690 | 10/1949 | De Giers . | |
| 3,106,693 | 10/1963 | De Giers . | |
| 3,113,282 | 12/1963 | Coleman . | |
| 3,735,638 | 5/1973 | Miller | 73/304 R X |
| 3,777,177 | 12/1973 | Norkum et al. | 73/304 R X |
| 4,084,436 | 4/1978 | Smitherman | 73/313 |
| 4,227,236 | 10/1980 | Kübler | 73/313 X |
| 4,345,235 | 8/1982 | Riley et al. | 338/176 |
| 4,483,192 | 11/1984 | Wachter | 73/313 X |
| 4,627,283 | 12/1986 | Nishida et al. | 73/313 |
| 4,637,254 | 1/1987 | Dyben et al. . | |
| 4,702,107 | 10/1987 | Guerrini et al. | 73/319 |
| 4,720,997 | 1/1988 | Doak et al. | 73/304 R X |
| 4,724,705 | 2/1988 | Harris | 73/304 R X |
| 4,779,460 | 10/1988 | Cruickshank . | |
| 4,920,798 | 5/1990 | Weaver . | |

FOREIGN PATENT DOCUMENTS

| | | | |
|---|---|---|---|
| 619958 | 5/1961 | Italy . | |
| 113318 | 5/1988 | Japan | 73/313 |

Primary Examiner—William A. Cuchlinski, Jr.
Assistant Examiner—G. Bradley Bennett
Attorney, Agent, or Firm—Woodard, Emhardt, Naughton, Moriarty & McNett

[57] ABSTRACT

A two wire and a three wire resistive fluid level sensor for measuring fluid levels within a container are disclosed. The sensor includes a plurality of resistors connected in series. The sensor produces an output signal by providing a short circuit to the circuit nodes between the resistors so that a stair-step output signal is created as the float moves in conjunction with the liquid level in a container. The value of the resistances can be varied in order to accommodate various cross-sectional tank contours and thus produce a usable, readily and easily configurable sensor. The structure of the sensors enables measurement of depth variances far in excess of prior art sensors.

24 Claims, 4 Drawing Sheets

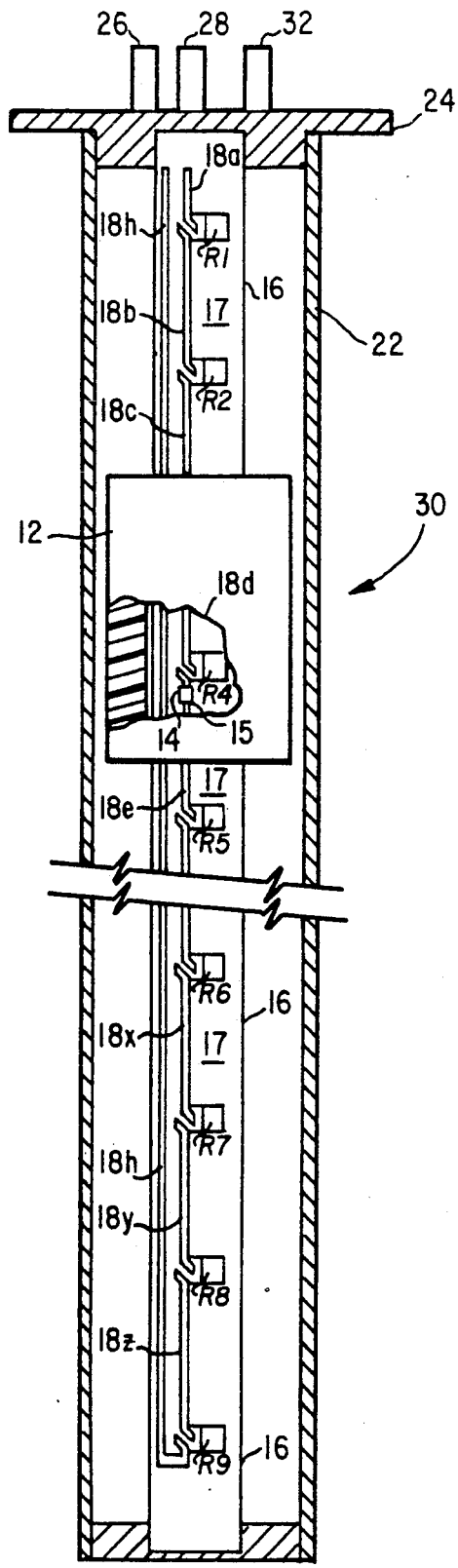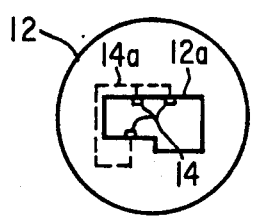
Fig.5
Fig.4
Fig.3

FLUID LEVEL SENSOR WITH STAIR STEP OUTPUT

BACKGROUND OF THE INVENTION

Field of the Invention 1. This invention relates to sensors for detecting fluid levels within a container, and more specifically to fluid level sensors for use in fuel tanks containing gasoline, diesel, or other volatile fuels.

The most commonly used fluid level sensor is the variable resistor sensor utilizing a float to produce a resistance change in the variable resistor. As the float moves vertically with the fluid level, the electrical resistance of the sensor changes typically from 30 to 270 ohms. In most sensors, a sliding or moving contact attached to the float establishes a resistive circuit based upon the position of the contact with respect to a wire-wound resistor or a thick film resistor printed on an insulating base or substrate.

Other approaches to fluid level detection include use of resistors with large temperature coefficients, known as thermistors, located at various vertical positions in the fluid reservoir. As electrical power is applied to the resistors, the devices immersed in the fluid remain cool while those that are exposed to air will increase in temperature and produce a change in overall resistance of the device. Extensive signal conditioning and temperature compensation circuitry is typically required with such a sensor to create a usable signal. Fluid compatibility and manufacturing costs limit widespread acceptance of this type of device.

A vertical sensor with a sliding contact has been used in some automotive applications. Typically a float provides a contact point with respect to a resistor. The resistor is usually a wire helix wound about an insulating mandrel.

Examples of prior art fluid level sensors are shown in the following patents: U.S. Pat. Nos. 4,637,254 to Dyben et al., 4,779,460 to Cruickshank, 3,113,282 to Coleman, 3,106,693 to de Giers, 2,484,690 to de Giers, and Italian Patent No. 619,958 to Carlo Ceresa et al.

An example of thick film resistor technology used in a liquid level sensor is shown in Weaver, U.S. Pat. No. 4,920,798. The Weaver device includes a thick film resistive coated plate with a slidable contact member providing a resistive signal in proportion to the position of the float.

Trucks and large vehicles which have fuel tanks with a depth of 50 centimeters or more have experienced long-term reliability problems with fuel sensors. In addition, accuracy of fluid level detection is also a problem. Further, vehicle design and space requirements may restrict the mounting location for the sensor to the side or bottom of the fuel tank as a result of interferences. Leaks attributable to the mounting location and resistor failure due to vibration are common occurrences in such applications. Many different physical sizes and operating geometries are required due to the significant number of different tank and vehicle mechanical designs. Typical tank depths for trucks may range from 30 centimeters to 150 centimeters.

Off-road vehicles such as bulldozers, cranes, loaders and forklifts often are not equipped with fuel level sensors. Typically such vehicles are produced in small quantities and the economics of producing sensors for these applications are cost prohibitive in view thereof. The anticipated long service life and extreme vibration of physical movement of this type of equipment renders conventional sensors impractical. Tank depths in this field vary from 60 centimeters to 200 centimeters. Since many of these tanks are long and narrow, the sensor may be subjected to significant wear as a result of constant fuel sloshing within the tank. Storage tanks used for petroleum products and other liquids often use a mechanical or manually operated dipstick for measuring fluid level within the tank. Electronic sensors and indicators have not generally been cost effective in this particular application. Tank materials may be metal or plastic or combinations thereof, and tank depths may extend up to 4 meters.

A liquid level sensor for use in harsh environments suitable for larger liquid containers is needed to resolve the above difficulties which arise in detecting fuel level within a container.

SUMMARY OF THE INVENTION

A fluid level sensor according to one embodiment of the present invention includes a conductive strip having a first and a second surface, an insulator attached to and substantially covering the first surface of the strip, first, second and third conductive segments mounted on the insulator in a substantially linear arrangement, a first resistive device attached to the insulator and electrically connected between the first conductive segment and the second conductive segment, a second resistive device attached to the insulator and electrically connected between said second conductive segment and said third conductive segment, a float including a hole therethrough for receiving the strip, the float disposed about the strip and movable in response to the fluid level in the container, and electrical contact means attached to the float for electrically connecting the second surface of the strip and one of the first, second, or third conductive segments when the float is positioned about the strip.

One object of the present invention is to provide an improved fuel level sensor for use in harsh environments.

Another object of the present invention is to provide a fuel level sensor which is capable of detecting fluid level variances in excess of those of the prior art.

A further object of the present invention is to provide a fuel level sensor which may be configured to provide a nonlinear output signal or resistance proportional with the cross-sectional contours of the container in which the sensor is mounted.

Related objects and advantages of the present invention will become more apparent from the following description.

BRIEF DESCRIPTION OF THE DRAWINGS

FIG. 3 is a cutaway front elevational view of a fuel level sensor according to the present invention.

FIG. 4 is a top view of the float shown in FIG. 3.

FIG. 5 is a top view of the conductive strip of FIG. 3.

FIG. 9 is a graph depicting the output in ohms of a fluid level sensor according to the present invention in relation to float position.

DESCRIPTION OF THE PREFERRED EMBODIMENT

Figure 1:
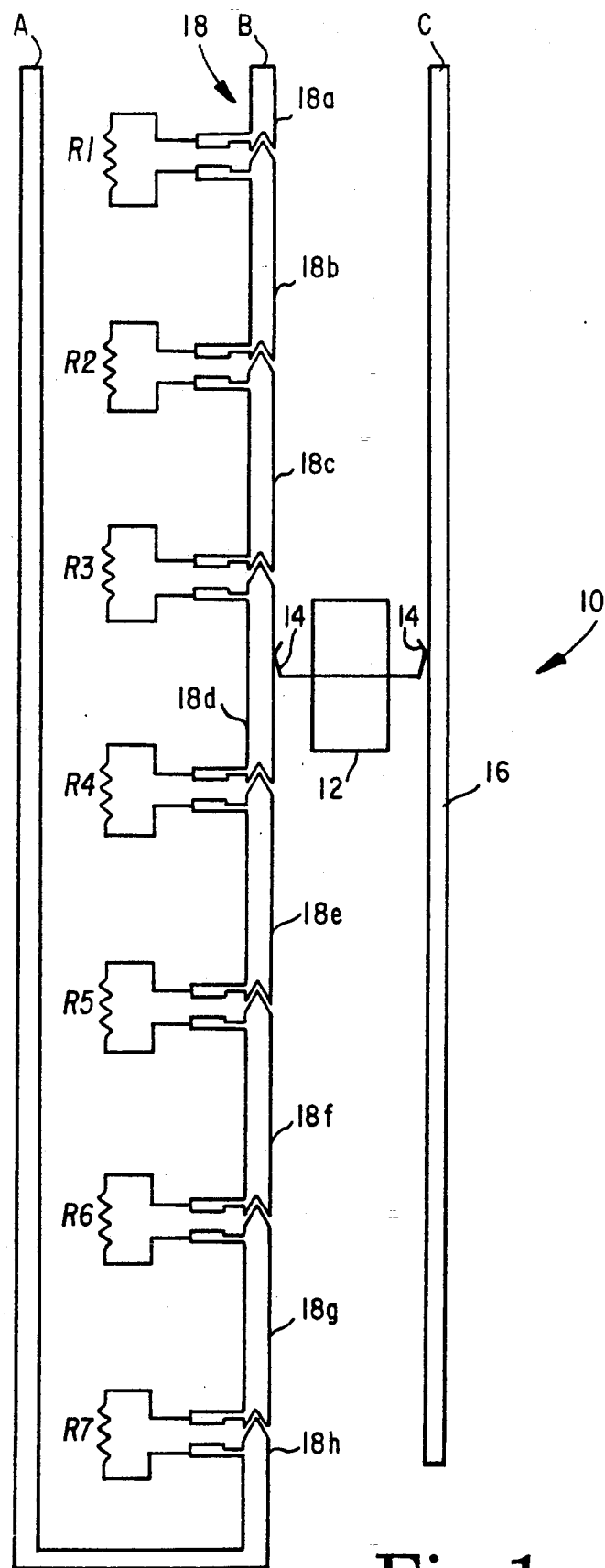
FIG. 1 is a diagrammatic illustration of one embodiment of the fuel level sensor according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to FIG. 1, a diagrammatic illustration of a three wire fluid level sensor 10 according to the present invention is shown. The sensor 10 includes float 12, contacts 14, conductor 16, segmented conductor 18 comprised of conductive segments 18a-18h and resistors $R_1$-$R_7$. Conductive segment 18h is shorted to conductor 16 when the float 12 is positioned at the lowest point of travel in a container (not shown). The contacts 14 attached to float 12 are positioned so that the relative vertical position of the contacts 14 corresponds with the fluid level in the container (not shown).

Figure 6:
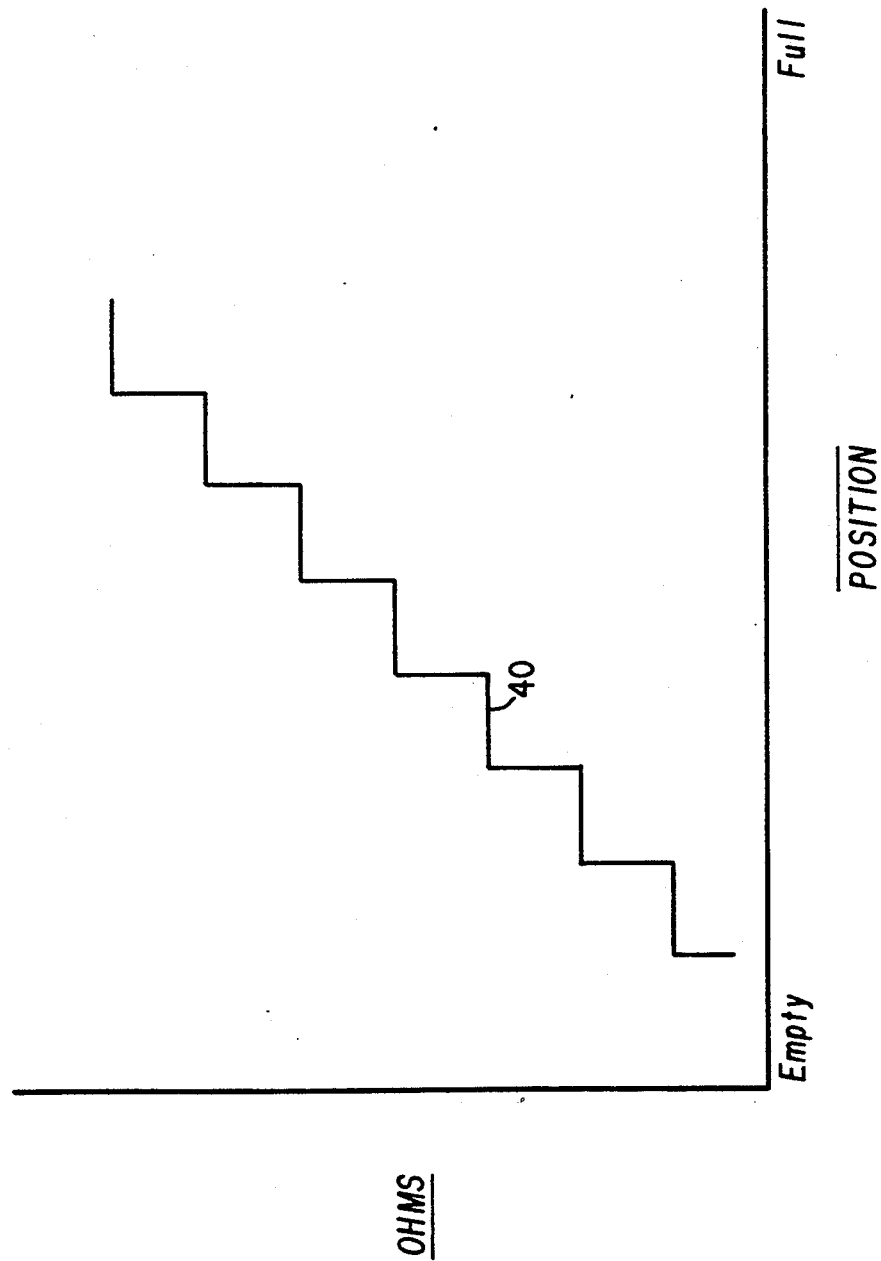

Functionally, in a typical application a fixed voltage reference signal is supplied between points A and B. The voltage measured at point C is used to proportionally determine the position of float 12. Since voltage instead of resistance is the measured quantity, any variance in the resistance of resistors $R_1$-$R_7$ will not affect the accuracy of the sensor 10. The voltage appearing at point C as float 12 moves from the bottom of the container, to the top of the container, corresponds to the curve 40 shown in FIG. 6. Although the curve 40 represents ohms, in a three wire sensor such as sensor 10, the ohmage resistance will translate directly into voltage deviations for the three wire potentiometer.

Resistors $R_1$-$R_7$ can be chosen or selected to have values such that the voltage present on any of the individual segments 18a-18h will provide an accurate voltage corresponding to the amount of liquid remaining in a container, i.e. if the container is not rectangular in cross section, the value of the resistors may be chosen so that the voltage produced at any particular fluid level will correspond substantially with the actual volume of fluid remaining in the container. For example, if the container is hourglass shaped, resistors $R_1$ and $R_2$ as well as resistors $R_6$ and $R_7$ would have larger ohmic values, whereas resistors $R_3$-$R_5$ would have lower ohmic resistance so that the voltage present on point C will have a larger stair-step change when the float moves from a position shorting segment 18h to conductor 16 to a position shorting segment 18g to conductor 16.

Figure 2:
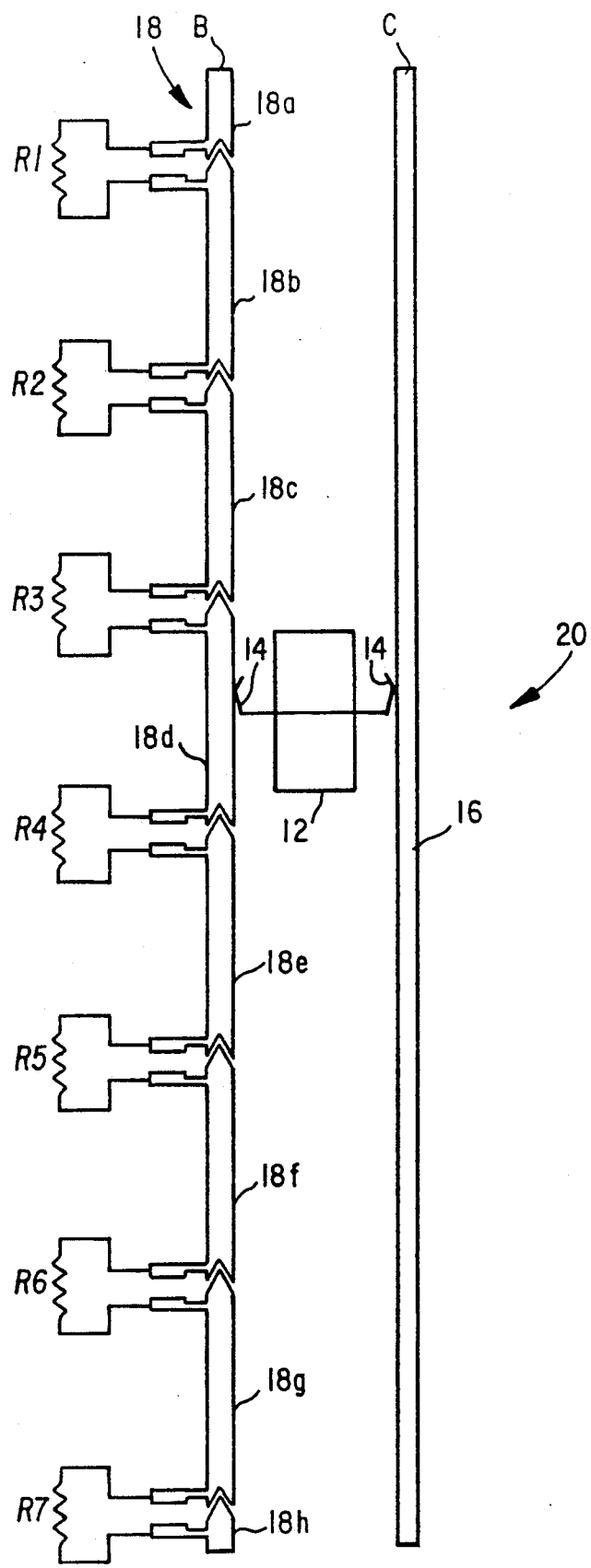
FIG. 2 is a diagrammatic illustration of another embodiment of the fuel level sensor according to the present invention.

Referring now to FIG. 2, fluid level sensor 20 according to the present invention is shown. The sensor 20 includes nearly all of the components as sensor 10 of FIG. 1 with the difference being that sensor 20 is a two wire sensor or rheostat version. Sensor 20 is used in the identical fashion as sensor 10 for sensing liquid levels in a container. Typically the sensor 20 is connected into a circuit as a series resistance at points B and C. As the position of float 12 changes with respect to the fluid level in the container, contacts 14 provide an electrical short between one of the various segments 18a-18h and conduct 16. Thus the resistance for the sensor 20 varies from 0 ohms all the way up to the sum of the resistances of resistors $R_1$-$R_7$.

As with the embodiment of FIG. 1, the sensor 20 of FIG. 2 can be "tailored" to a particular application so that the resistance between points B and C will accurately correspond to the actual amount of fluid remaining in a container by varying the values of resistors $R_1$14 $R_7$ to correspond proportionately to container cross-sectional contours.

Referring now to FIG. 3, a cross-sectional front elevational view of a sensor 30 according to the present invention is shown. This embodiment of the sensor 30 incorporates the sensor 10 of FIG. 1 into a cylindrical housing 22 having mounting flange 24 and bottom flange 26 retaining the sensor fixedly within the anti-slosh cylindrical housing 22. Housing 22, flange 24 and flange 26 are made of polypropylene. Flange 24 and flange 26 include holes (not shown) which allow liquids to enter and leave the space defined by the inner walls of housing 22.

Resistors $R_1$-$R_9$ are surface mount device resistors. Such resistors are well known in the art and may be made of ceramic/metallic mixtures commonly referred to as cermet thick film resistors or other resistive materials suitable for exposure to the liquids which will contact the resistors. A thick film resistive paste is deposited onto a ceramic substrate and heated to a temperature sufficient to reflow or melt the thick film paste. Laser trimming of the resistors $R_1$-$R_9$ is contemplated as a convenient process for achieving desired resistance values. The resistors are situated film side down on insulator 17 and solder techniques are employed to attach the resistors to the conductive segments 18a-18z. Hot plates, infrared ovens or soldering iron solder connection technology well known in the art are contemplated as techniques useful in attaching the resistors mechanically and electrically to the appropriate segments 18a-18z.

An aluminum strip 16 is the support member for the components of the sensor shown in FIG. 1. As in readily recognizable, the sensor 10 can be configured to any length, thus additional conductive segments 18x, 18y and 18z are shown in FIG. 3 to illustrate that the conductive segment 18 may include a number of segments interconnecting corresponding resistors in excess of the number shown in FIG. 1. The cutaway view of float 12 reveals the location of contacts 14 provide an electrical short between the location 15 and the aluminum conductor 16. Location 15 correpsonds electrically to the circuit node between resistors $R_4$ and $R_5$, which are connected in series with the remaining resistors. Were the sensor 10 located in a container, the position of the float 12 would correspond with the liquid level in the container at location 15 where contact 14 makes electrical contact with the conductive segment 18e.

Referring now to FIG. 5, a top view of the aluminum strip 16 is shown including the insulator 17 disposed on one surface of the strip 16. Resistor $R_1$ and conductive segments 18a and 18h are visible in this view of the strip 16. Conductive strips 18a-18z conductive plastic conductor silk screen deposited onto insulator 17. Insulator 17 is a plastic film, such as KAPTON film, a polyimide polymer manufactured by E. I. dupont de Nemours, and is laminated to the aluminum strip with petroleum resistant adhesives. KAPTON film is resistant to attack by most petroleum based fuels and is thus ideally suited for this application. The conductive plastic conductor used for segments 18a-18z is manunfactured using silver or copper metal particles suspended in a plastic polymer. Such a product is available from Minico/Asahi Chemical of America, a thick film materials supplier, located at 50 North Harrison Avenue, Congers, N.Y. 10920.

An alternative approach for producing the conductive segments on an insulator, known as flexible circuit manufacturing processes, is also contemplated. Flexible circuit manufacturing processes include the steps of: 1) evaporation or sputter deposition of copper onto an insulator; 2) silk screen printing of an acid resistive material on the copper surface; and 3) acid etching of the exposed copper to produce conductive runners or conductive segments on the insulator surface. Both thick film technology and flexible circuit technology are complemplated as viable alternatives for producing the insulator with conductive segments shown in FIGS. 3 and 5.

Referring now to FIG. 4, a top elevational view of the float 12 of FIG. 3 is shown. The contacts 14 disposed within the hole 12a provide an electrical short between one of the segments 18a-z and the conductor 16 based upon the float position. The contacts 14 are connected electrically by a conductor 14a shown as a broken line in FIG. 4. The irregular shape of hole 12a accommodates the profile of resistors $R_1$-$R_9$. The float 12 is typically made from nitrile rubber or other closed cell foam material which is resistive to liquid fuel absorption or decomposition by fuels such as diesel fuel, gasoline, methanol etc.

As is apparent from the above description of the embodiments of the invention, there are no constraints on the total length and resistance of the sensors 10, 20 or 30 in any float height versus output voltage/resistance. Any voltage relationship or resistance relationship can be accommodated or created. Typical analog gasoline gauges when used with conventional signal damping circuitry will accept the stair-step output signal from the sensors 10, 20, and 30 without significant modification or change from the original design for use with a standard linear resistance output fluid level sensor. Referring now to FIG. 3, connection terminals 26, 28 and 32 are electrically connected to conductive segment 18h, conductive segment 18a, and conductor 16, respectively to enable convenient connection to an analog or digital fuel gauge (not shown). Thus a two or three wire potentiometric fluid level sensor is provided. It will be evident that the two wire sensor 20 of FIG. 2 can be located in the cylindrical housing shown in FIG. 3. For a two wire sensor, connecting to terminals 28 and 30 will provide an appropriate rheostat response signal or resistance.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A liquid level sensor for providing a variable resistance corresponding to fluid level in a container, said sensor comprising:
   a conductive strip having a first and a second surface;
   an insulator attached to and substantially covering said first surface of said strip;
   first, second, and third conductive segments mounted end to end on said insulator in non-touching substantially linear arrangement;
   a first resistive device attached to said insulator and electrically connected between said first conductive segment and said second conductive segment;
   a second resistive device attached to said insulator and electrically connected between said second conductive segment and said third conductive segment;
   a float including a hole therethough for receiving said strip, said float disposed about said strip and movable in response to the fluid level in the container;
   electrical contact means attached to said float for electrically connecting said second surface of said strip and one of said first, second, or third conductive segments when said float is positioned about said strip
   wherein said first and second resistive devices are discrete resistors connected in series.

2. The sensor of claim 1 wherein said insulator is a plastic film.

3. The sensor of claim 2 wherein said first, second, and third conductive segments are conductive plastic resistor ink.

4. The sensor of claim 3 wherein said plastic film is KAPTON film.

5. The sensor of claim 4 wherein said resistive devices are surface mount device resistors.

6. The sensor of claim 1 including first terminal means electrically connected to said conductive strip for enabling an electrical connection to said conductive strip and second terminal means electrically connected to said first conductive segment for enabling an electrical connection to said first conductive segment.

7. The sensor of claim 6 including a third terminal means electrically connected to said third conductive segment for enabling an electrical connection to said first conductive segment.

8. The sensor of claim 7 wherein said insulator is a plastic film and wherein said resistive devices are surface mount device resistors.

9. The sensor of claim 1 wherein said first, second, and third conductive segments, and said insulator are components of a flexible circuit assembly.

10. A liquid level sensor comprising:
    a conductive strip;
    an insulator mounted on said conductive strip;
    at least three resistors attached to said insulator;
    non-continuous connection means for electrically connecting said resistors in series;
    contact means for providing a short circuit between said non-continuous connection means and said conductive strip; and
    a float having said contact means attached thereto, said float positioning said contact means relative to the liquid level.

11. The sensor of claim 10 wherein said insulator is a plastic film.

12. The sensor of claim 11 wherein said float includes a hole therethrough for receiving said conductive strip.

13. The sensor of claim 12 wherein said non-contiguous connection means is a conductive plastic resistor ink attached to said plastic film.

14. The sensor of claim 13 wherein said plastic film is a polyimide polymer.

15. The sensor of claim 14 including a first connection terminal connected to said conductive strip, a second connection terminal attached to a first end of said resistors connected in series, and a second connection terminal attached to a second end of said resistors connected in series.

16. The sensor of claim 10 wherein said insulator and said non-continuous connection means are components of a flexible circuit assembly.

17. A liquid level sensor for providing a variable resistance corresponding to fluid level in a container, said sensor comprising:

an elongated conductive strip having a first and second surface;

an insulator attached to and substantially covering said first surface of said strip;

at least three resistive devices substantially linearly arranged and attached to said insulator, said resistive devices each having two electrical contact points;

a plurality of conductors attached to each of said electrical contact points of said resistive devices and electrically connecting said resistive devices so that each conductor completes a circuit between adjacent ones of said resistive devices to form a series resistive circuit wherein all of said resistive devices are connected in series;

a float including a hole therethrough for receiving said strip; and electrical contact means attached to said float for electrically connecting said second surface of said strip and one of said conductors when said strip is disposed in said hole of said float.

18. The sensor of claim 17 including a generally cylindrical support tube and wherein said conductive strip is mounted within said tube.

19. The sensor of claim 18 wherein said float is made of nitrile rubber, said resistive devices are surface mount device resistors, said plurality of conductors are conductive plastic resistor ink, and said insulator is a plastic film made of polyimide polymer.

20. The sensor of claim 17 wherein said elongated conductive strip is disposed substantially vertically within the container, said sensor further including a first end conductor and a second end conductor, said series resistive circuit connected between said first and second end conductors, said electrical contact means connecting said first end conductor to said conductive strip when said float is positioned substantially near the top of the container, and said electrical contact means connecting said second end conductor to said conductive strip when said float is positioned near the bottom of the container.

21. The sensor of claim 17 wherein said insulator and said plurality of conductors are components of a flexible circuit assembly.

22. A liquid level sensor for detecting the level of liquid in a container, said sensor comprising:

at least three discrete resistors disposed substantially vertically with respect to one another and substantially linearly;

a plurality of connection conductors spacing apart and connecting said resistors to form a series resistive circuit;

a ground conductor disposed in substantially parallel relationship with said series resistive circuit;

a float disposed in close proximity to said series resistive circuit and movable in response to the level of liquid in the container; and electrical contact means attached to said float for electrically connecting said ground conductor and one of said connection conductors.

23. The sensor of claim 22 including an insulator and wherein said resistors and said ground conductor are attached to said insulator.

24. The sensor of claim 23 wherein said float includes a hole therethrough and wherein said float is disposed about said insulator.

* * * * *

UNITED STATES PATENT AND TRADEMARK OFFICE
CERTIFICATE OF CORRECTION

PATENT NO. : 5,146,785

DATED : September 15, 1992

INVENTOR(S) : Richard E. Riley

It is certified that error appears in the above-identified patent and that said Letters Patent is hereby corrected as shown below:

In column 3, line 1, please delete "9" and insert in lieu thereof --6--.
In column 4, line 10, please delete "14" and insert in lieu thereof -- - --.
In column 4, line 42, please delete "in" and insert in lieu thereof --is--.
In column 4, line 49, please insert --which-- between "14" and "provide".
In column 4, line 62, please insert --are-- between "18a-18z" and "conductive".
In column 4, line 64, please delete "dupont" and insert in lieu thereof --duPont--.

Signed and Sealed this

Eleventh Day of January, 1994

Attest:

BRUCE LEHMAN

*Attesting Officer*  *Commissioner of Patents and Trademarks*